US009426267B2

(12) United States Patent
Choi et al.

(10) Patent No.: US 9,426,267 B2
(45) Date of Patent: Aug. 23, 2016

(54) MOBILE TERMINAL
(71) Applicant: LG ELECTRONICS INC., Seoul (KR)
(72) Inventors: Sungin Choi, Seoul (KR); Hoseok Chung, Seoul (KR); Younji Shin, Seoul (KR); Jungsuk Lee, Seoul (KR); Byungduck Park, Seoul (KR); Moonyoul Ahn, Seoul (KR)
(73) Assignee: LG ELECTRONICS INC., Seoul (KR)
( * ) Notice: Subject to any disclaimer, the term of this patent is extended or adjusted under 35 U.S.C. 154(b) by 161 days.
(21) Appl. No.: 13/836,112
(22) Filed: Mar. 15, 2013
(65) Prior Publication Data
US 2014/0168867 A1 Jun. 19, 2014
(30) Foreign Application Priority Data
Dec. 17, 2012 (KR) .................. 10-2012-0147232
(51) Int. Cl.
*H04B 1/38* (2015.01)
*H04M 1/00* (2006.01)
*H01H 13/06* (2006.01)
(Continued)
(52) U.S. Cl.
CPC .............. *H04M 1/236* (2013.01); *H04M 1/026* (2013.01)
(58) Field of Classification Search
CPC ............ H04M 1/0202; H04M 1/0214; H04M 1/0249; H04M 1/0252; H04M 1/0254; H04M 1/0283; H04M 1/02; H04M 1/23; H04M 1/233; H04M 1/236; H04B 1/3833; H04B 1/3888; H01H 1/5805; H01H 13/14; H01H 13/48; H01H 13/705; H01H 13/807; H01H 23/145; H01H 23/30; H01H 25/00–25/041; H01H 25/006; H01H 1/26; H01H 13/12; H01H 13/702; H01H 15/06; H01H 15/10; H01H 15/107; H01H 21/06; H01H 21/22; H01H 23/06; H01H 23/14; G11B 15/106; G11B 19/022; G11B 19/01
USPC ................. 455/575.1–575.8; 200/293, 302.2, 200/302.3, 343, 344, 502, 520; 341/22, 34; 361/679.01, 679.02, 679.26, 679.27, 361/679.32, 679.58, 683; 379/413.04, 379/433.01
See application file for complete search history.

(56) References Cited
U.S. PATENT DOCUMENTS
7,554,050 B1 * 6/2009 Lv .................................. 200/339
7,697,281 B2 * 4/2010 Dabov et al. ............. 361/679.55
(Continued)

*Primary Examiner* — Yuwen Pan
*Assistant Examiner* — Paul P Tran
(74) *Attorney, Agent, or Firm* — KED & Associates, LLP

(57) ABSTRACT

There is disclosed a mobile terminal including a rear case having a back plate and a lateral wall; a front case coupled to a front surface of the rear case to form a predetermined space where components are mounted; a button hole formed in the lateral wall; a retaining projection projected from an inner surface of the button hole in a perpendicular direction with respect to the lateral wall; a side key inserted in the button hole; and a retaining rib extended from an inner or lateral surface of the side key to be fastened to the retaining projection, such that in case the button hole may be provided in the lateral surface of the rear case to insert the side key therein, the retaining projection which is able to be integrally formed with the button hole and the retaining rib which is able to be coupled to the retaining projection stably can be arranged to retain the side key stably in a process of assembling the side key.

14 Claims, 9 Drawing Sheets

| (51) | Int. Cl. | |
|---|---|---|
| | *H01H 3/00* | (2006.01) |
| | *H01H 13/00* | (2006.01) |
| | *H01H 13/70* | (2006.01) |
| | *H03K 17/94* | (2006.01) |
| | *H03M 11/00* | (2006.01) |
| | *G06F 1/16* | (2006.01) |
| | *H05K 5/00* | (2006.01) |
| | *H05K 7/00* | (2006.01) |
| | *H05K 7/02* | (2006.01) |
| | *H05K 7/04* | (2006.01) |
| | *H04M 1/23* | (2006.01) |
| | *H04M 1/02* | (2006.01) |

(56) References Cited

U.S. PATENT DOCUMENTS

| | | | |
|---|---|---|---|
| 7,884,297 B2* | 2/2011 | Okuzumi | 200/339 |
| 2005/0272491 A1* | 12/2005 | Jeon | 455/575.8 |
| 2008/0088489 A1* | 4/2008 | Moon | 341/22 |
| 2008/0264768 A1* | 10/2008 | Shi | H01H 15/10 200/344 |
| 2009/0159412 A1* | 6/2009 | Liu | H01H 13/84 200/302.3 |
| 2009/0301854 A1* | 12/2009 | Yang et al. | 200/343 |
| 2010/0219057 A1* | 9/2010 | Okuzumi | 200/5 A |
| 2012/0162940 A1* | 6/2012 | Qiu | H01H 15/10 361/752 |
| 2013/0105288 A1* | 5/2013 | Derengowski | H01H 13/063 200/302.2 |

* cited by examiner

MOBILE TERMINAL

CROSS-REFERENCE TO RELATED APPLICATION(S)

This application claims priority under 35 U.S.C. §119 to Korean Application No. 10-2012-0147232 filed on Dec. 17, 2012, whose entire disclosure is hereby incorporated by reference.

BACKGROUND

1. Field

The present disclosure relates to a mobile terminal to which a structure for retaining a side key stably is added, with no tape temporarily attached to the mobile terminal when a mobile terminal is assembled.

2. Background

Terminals can be classified into mobile/portable terminals and stationary terminals according to presence or non-presence of mobility. And, the mobile terminals can be further classified into handheld terminals and vehicle mount terminals according to availability for hand-carry.

Functions performed by such the terminals are diversified and the terminals have been configured as multimedia players having various functions. Examples of such functions may include capturing images and video, playing music and video files, game playing and receiving broadcast.

A user input unit positioned in a front surface of the terminal to secure a display region is arranged in a lateral surface as a side key. As a mobile terminal is getting slimmer, it is difficult in an assembling process to retain such side key and a tape is used in retaining the side key. When the terminal is released, the tape used in retaining the side key is removed and there is a problem of inconvenient processes.

SUMMARY OF THE DISCLOSURE

Accordingly, the present disclosure is directed to a mobile terminal that substantially obviates one or more problems due to limitations and disadvantages of the related art. An object of the present disclosure is to provide a mobile terminal to which a structure for retaining a side key stably is added, with no tape temporarily attached to the mobile terminal when a mobile terminal is assembled.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages, as embodied and broadly described herein, a mobile terminal includes a rear case comprising a back plate and a lateral wall; a front case coupled to a front surface of the rear case to form a predetermined space where components are mounted; a button hole formed in the lateral wall; a retaining projection projected from an inner surface of the button hole in a perpendicular direction with respect to the lateral wall; a side key inserted in the button hole; and a retaining rib extended from an inner or lateral surface of the side key to be fastened to the retaining projection.

According to at least one of embodiments, in case the button hole may be provided in the lateral surface of the rear case to insert the side key therein, the retaining projection which is able to be integrally formed with the button hole and the retaining rib which is able to be coupled to the retaining projection stably can be arranged to retain the side key stably in a process of assembling the side key.

Effects and/or advantages obtainable from the present disclosure are non-limited the above mentioned effect. And, other unmentioned effects and/or advantages can be clearly understood from the following description by those having ordinary skill in the technical field to which the present disclosure pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION

In the following detailed description, reference is made to the accompanying drawing figures which form a part hereof, and which show by way of illustration various embodiments.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The various features described herein may be applicable to a various types of mobile terminals. Examples of such terminals may include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification may also be applicable to a fixed terminal such as a digital TV, a desktop computer and the like as well as a mobile terminal.

Figure 1:
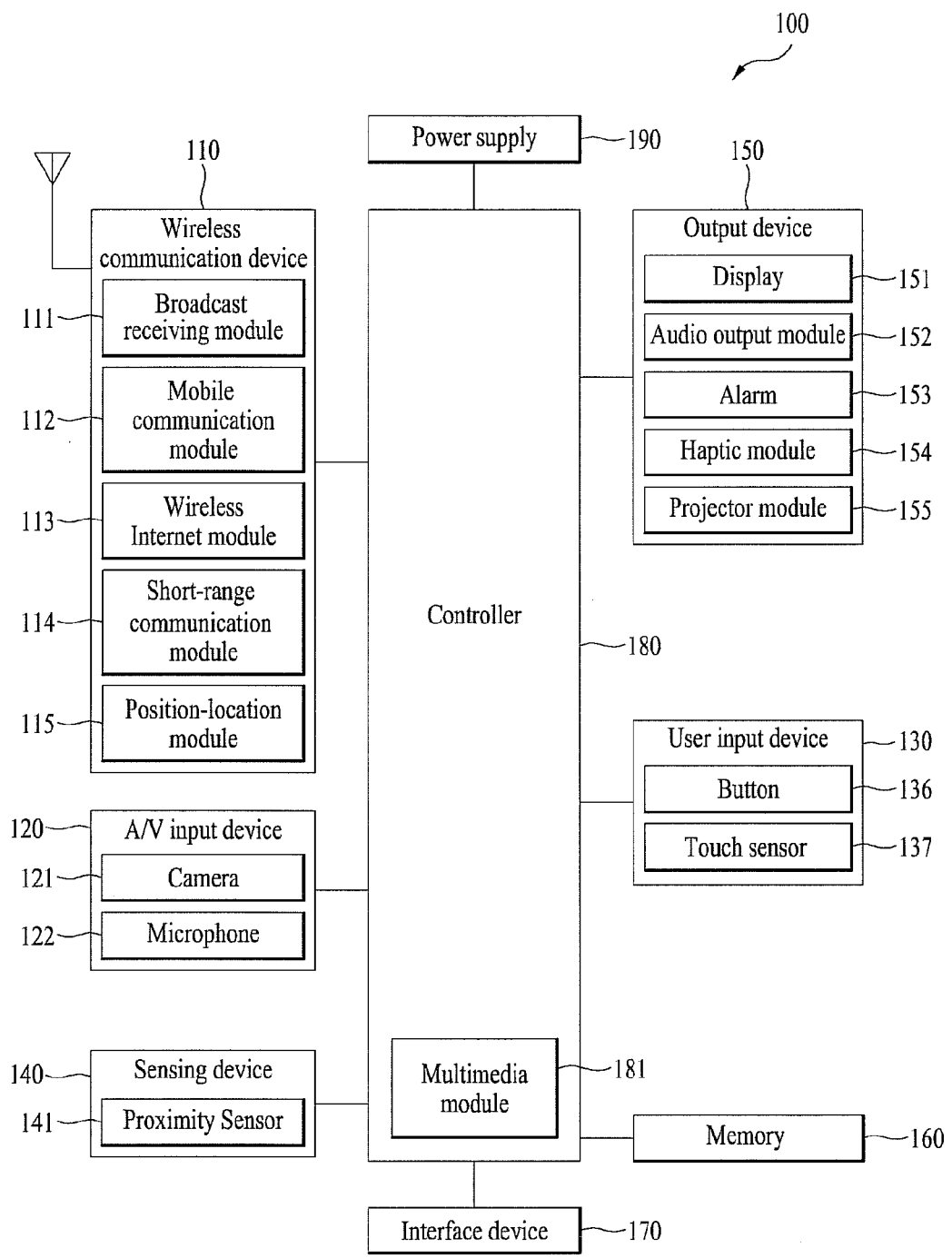
FIG. 1 is a front perspective diagram of a display device according to one embodiment of the present disclosure.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such a sensing unit 140 may include, a gyro sensor, an acceleration sensor, a geomagnetic sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
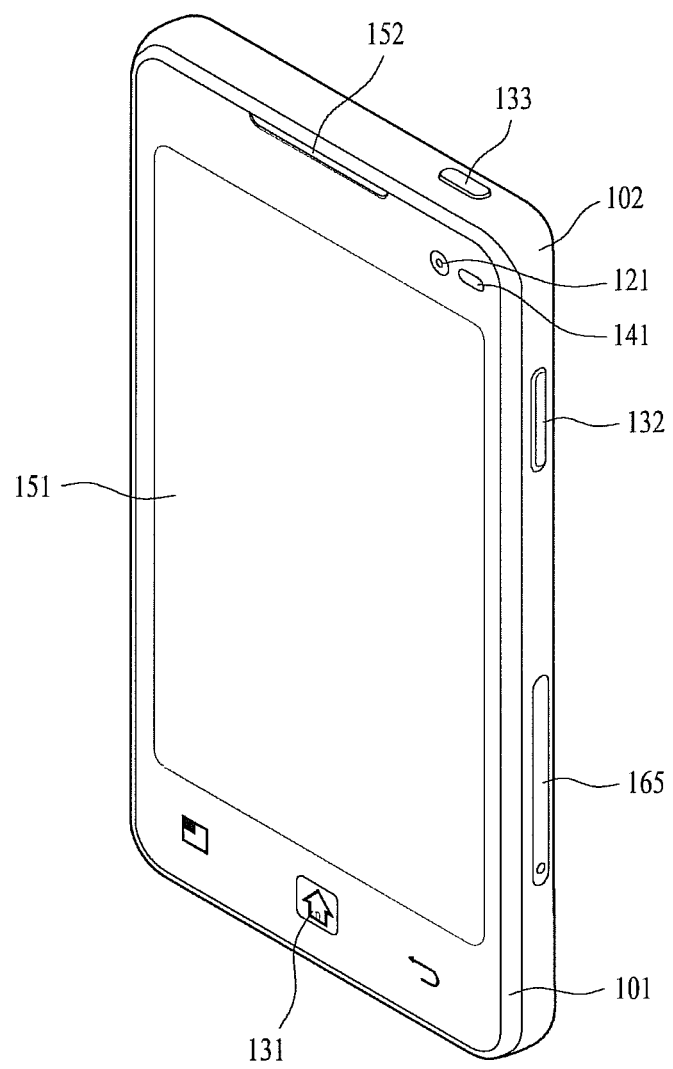
FIG. 2 is an exploded perspective diagram of a display unit, a touch panel and a window glass in a display device according to one embodiment of the present disclosure.
Figure 3:
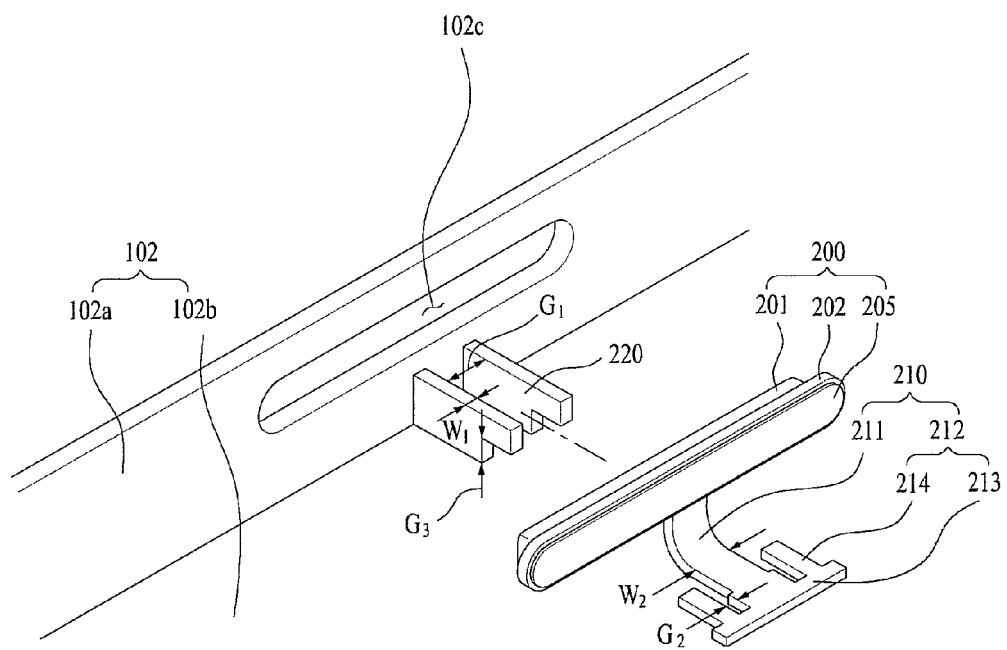
FIGS. 3 to 7 are diagrams illustrating a side key and a case that are provided in the mobile terminal according to one embodiment of the present disclosure.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present disclosure.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 configured to cover the surface of the rear case 102. In particular, the backside cover 103 may have a detachable configuration for the user's convenience. If the backside cover 103 is detached from the rear case 102, the surface of the rear case 102 may be exposed. The case 101, 102, and 103 may have various configurations and may also be referred to herein as a case, casing, enclosure, housing, or the like.

If the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' provided on the rear side of the mobile terminal 100.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include, for example, a plurality of manipulating units 131, 132 and 133. The manipulating units 131, 132 and 133 can be referred to as a manipulating portion and may adopt any mechanism of a tactile manner that enables a user to perform a manipulation action by experiencing a tactile feeling. For example, the manipulating units 131, 132 and/or 133 may be a side key or a switch, such as a button, toggle switch, slide switch, or another appropriate type of switch based on the functionality, form factor, and intended application.

Content input by the first, second or third manipulating unit 131, 132 or 133 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the third manipulating unit 133. It should be appreciated that the various manipulating units 131, 132, or 132 are not limited to a particular function and may be configured to perform various types of functions.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

FIGS. 3 to 7 are diagrams illustrating a side key and a case that are provided in the mobile terminal according to one embodiment of the present disclosure. This embodiment has a structure configured of a rear case and a side key 200 inserted in a button hole 102c formed in a lateral wall 102a of the rear case.

The rear case 102 includes of a back plate 102b and a lateral wall 102a projected forward from the back plate 102b. The button hole 102c is formed in the lateral wall 102a and the side key 200 is inserted in the button hole 102c. The button hole 102c may be formed entirely on the lateral wall 102a or may be formed at the intersection between the rear case 102 and the front case 102. In addition, the rear case 102 includes a retaining projection 220 extended near the button hole 102c from the lateral wall 102a. The retaining projection 220 may extend up to a prescribed distance from the button hole 102c or up to an edge of the button hole 102c. For example, the retaining projection 220 may be extended relative to the button hole 102c to provide support for the side key 200.

The side key 200 may include a top key 201 having a predetermined size corresponding to the size of the button hole 102c to be inserted in the button hole 102c and a base key 202 extended from a rear surface of the top key in a lateral direction to be retained in the button hole 102c by contacting inside circumference of the button hole 102c. A metallic dome and a flexible circuit board are connected with each other in a rear surface of the base key 202. Once the side key 200 is pressed, the metallic dome is pressed and an electrical signal is generated to be transmitted to a main circuit board of the mobile terminal via the flexible circuit board.

The case of the mobile terminal may be fabricated in an injection molding method. In the injection molding, plastic is heated to be in a molten state and the molten plastic is injected in a hole of a mold by using a piston. Once the molten plastic flows to an edge of the mold, the injection is stopped and hard plastic is injection-molded when the mold is divided.

To mold the plastic according to the injection molding method, the mold moves in one direction and the shape of the injection molded plastic is restricted. For example, a mold that is able to assemble in a direction of a hole has to be used to fabricate the injection molded plastic having a hole.

Figure 4:
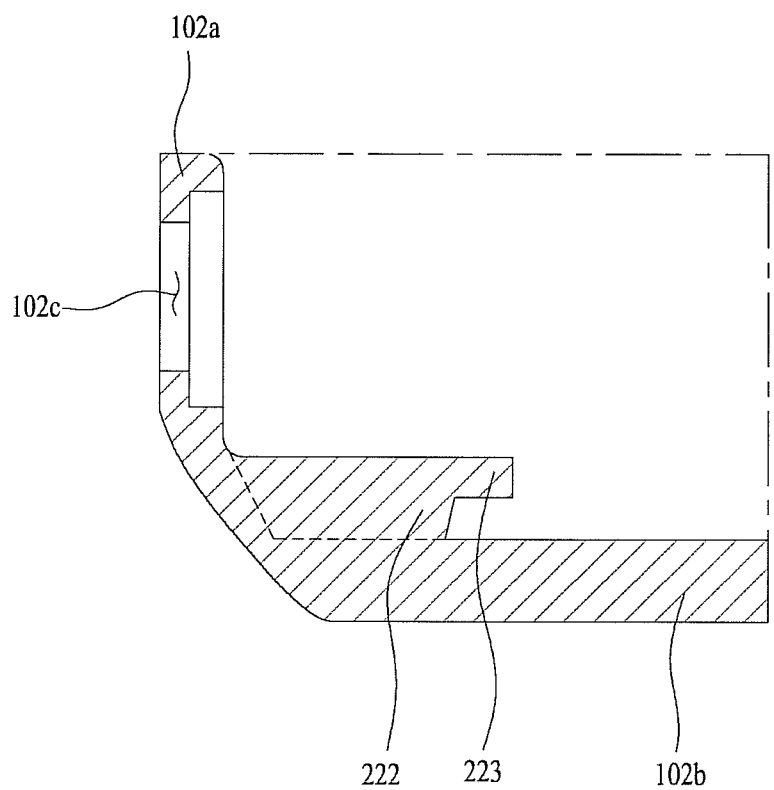

As shown in FIG. 4, the side key 200 according to the present disclosure may have the button hole 102c formed in the lateral wall 102a of the rear case 102 and it may be inserted in the button hole 102c. To fabricate the rear case 102 having the button hole 102c according to the injection molding method, a mold that is able to be coupled to right and left portions of the lateral wall 102a, shown in the drawings, has to be used.

The side key 200 inserted in the button hole 102c cannot be secured to the rear case 102 in the assembling process, only when it is inserted in the button hole 102c. In addition, a retaining rib 210 can be provided to retain the side key 200 to the rear case 102 such that the side key 200 cannot be separated by an external shock easily while it is used. The retaining rib 210 may be extended from the side key 200 and fastened to a retaining projection 220 formed in the rear case 102.

Here, the retaining projection 220 according to the present disclosure may not be projected from the back plate 102b but from the lateral wall 102a. To form the retaining projection 220 together with the button hole 102c, it is designed that the retaining projection 220 may be projected from the lateral wall 102a, considering a moving direction of the mold coupled in a lateral direction. The retaining projection 220 may have various configurations and may also be referred to herein as a protrusion, a retainer, a mounting bracket, or a connector (e.g., a female connector). Moreover, the retaining projection 220 may be formed of a material that allows a prescribed amount of flexibility for engaging with a connector or may be rigid.

Only one retaining projection 220 may be formed. Alternatively, as shown in FIGS. 3 to 9, a pair of retaining projections 220 may be formed. As the side key 200 is extended in a lateral direction longitudinally along the lateral wall 102a, two or more retaining projections 220 may be provided for added stability.

In this embodiment, the retaining rib 210 may be disposed between the retaining projection 220 projected from the lateral wall 102a and the back plate 102b. The retaining rib 210 may be a protrusion, a retainer, a mounting bracket, a connector (e.g., a male connector), Specifically, the retaining rib 210 is configured of a band portion 211 extended from the side key 200 and a fastening portion 212 extended from an end of the band portion 211 to be insertedly disposed between the retaining projection 220 and the back plate 102b. The band portion 211 and fastening portion 212 may have various shapes and may also be referred to herein as a rib, a tab or a protrusion.

The band portion 211 of the retaining rib 210 has to be connected with the side key 200 such that it cannot be disposed between the back plate and the retaining projection 220. Accordingly, the fastening portion 212 extended in a lateral direction is further provided.

The retaining projection 220 has a portion 222 connected to the back plate 102b, adjacent to the lateral wall 102a, and the other opposite portion distant from the back plate 102b to form a gap G1. In other words, the retaining projection 220 may be partially connected to the back plate 102b at portion 222 and include a gap G1 formed at portion 223. The portion 223 may have various shapes and configurations and may also be referred to herein as a protrusion, a nob, a retainer, or a stud. The gap may have various shapes and configurations and may also be referred to herein as a notch, a slot, a slit, or a recess.

The fastening portion 212 may be formed to cover a predetermined portion of the retaining projection 220, in other words, the connected portion with the back plate 102b. Specifically, the fastening portion 212 includes a first wing 213 extended from an end of the band portion 211 in a lateral direction and a second wing 214 formed in an end of the first wing 213 parallel to the band portion 211 (see FIG. 3). The second wing 214 may form a gap G2 with the band portion 211. The thickness or width W1 of the connected portion 222 may correspond to the width of gap G2, for example, to allow for friction fitting. The gap G2 may have various shapes and configurations and may also be referred to herein as a notch, a slot, or slit. The second wing 214 may have various shapes and configurations and may also be referred to herein a rib, a tab or a protrusion.

Figure 5:
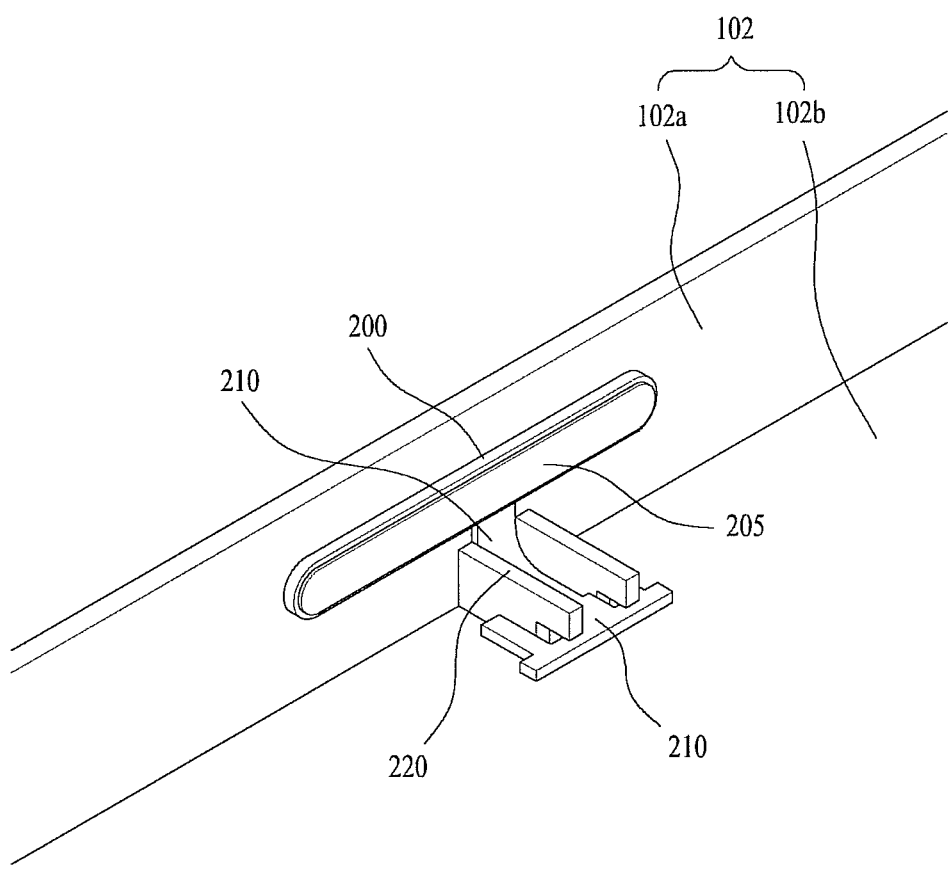
Figure 6:
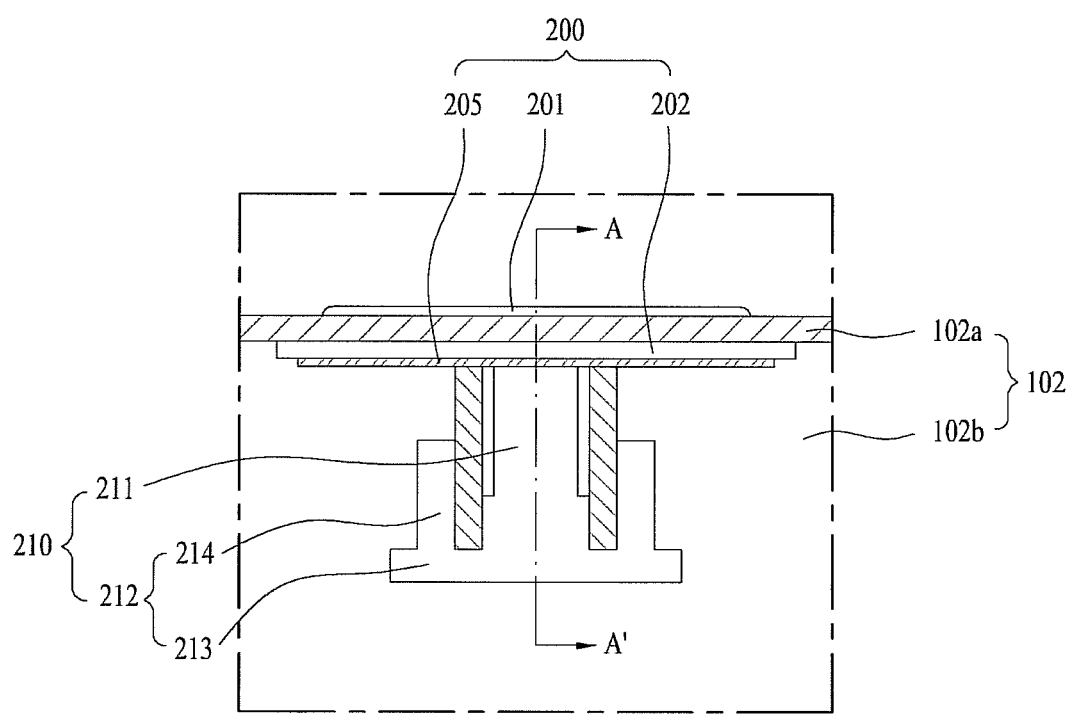

As shown in FIGS. 5 and 6, the connected portion of the retaining projection 220 with the back plate 102b is arranged between the band portion 211 and the second wing 214 and the first wing 213 is inserted in the other portion G3 of the retaining projection, in other words, between the back plate 102b and the retaining projection 220. The thickness or height of the first wing 213 may correspond to the height of the gap G3. The gap G3 may have various shapes and configurations and may also be referred to herein a notch, a slot, or slit.

If the retaining rib 210 is simply insertedly disposed only between the retaining projection 220 projected from the lateral wall 102a and the back plate 102b, without being engaged with the connected portion 222, the retaining rib 210 may move laterally along the lateral wall 102a, in a right and left direction. However, as shown in FIGS. 5 and 6, the retaining rib 210 is provided with the fastening portion 212 formed in a predetermined shape corresponding to the shape of the connected portion 222 of the retaining projection 220 connected to the back plate 102b, such that the moving of the retaining rib 210 in the lateral direction can be prevented to retain the side key 200 to the rear case 102 stably.

Figure 7:
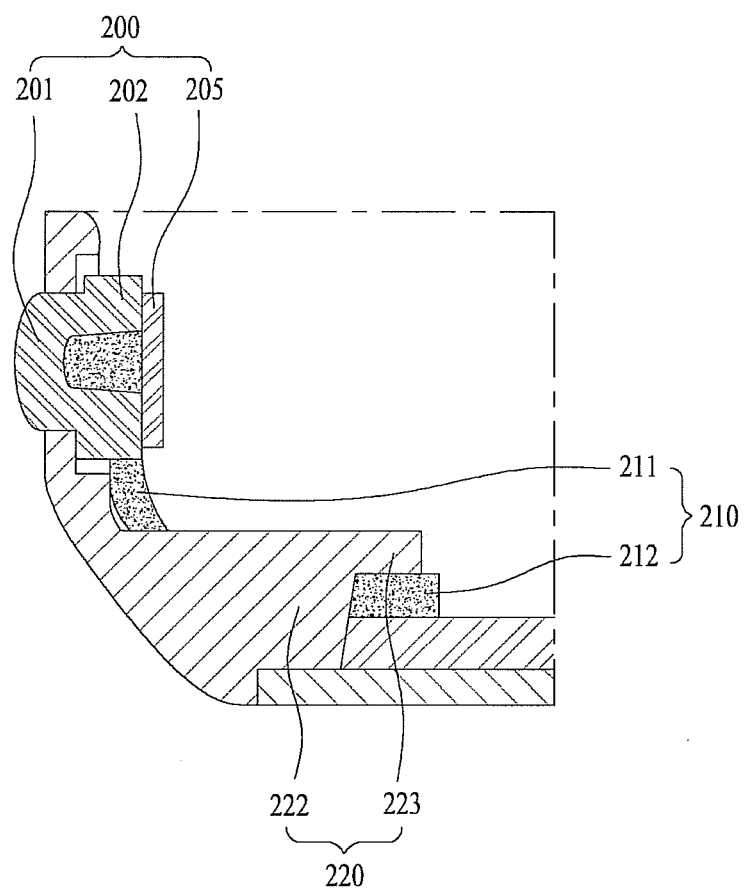

FIG. 7 is a sectional diagram of A-A' shown in FIG. 6. As shown in FIG. 7, the first wing 213 of the fastening portion 212 is secured between the retaining projection 220 and the back plate 102b, only to prevent the up-and-down movement of the fastening portion.

In case the pair of the retaining projections 220 is provided, a gap G1 between the retaining projections 220 can be formed to correspond to the thickness or width W2 of the band portion 211 such that the band portion 211 may be inserted in the gap G1 between the retaining projections 220. The band portion 211 is positioned between the retaining projections 220 to prevent the side key 200 from moving in a lateral direction.

The retaining rib 210 may be formed of a flexible material that is better than a hard material to be fixed to the retaining projection 220. When inserted in the gap between the retaining projections 220, the retaining rib 210 may be bent. The direction between the retaining projection 220 and the back plate 102b may be perpendicular to the direction of the side key 200, such that the band portion 211 may be formed of the flexible material to be bendable. The retaining rib 210 may be formed of a plastic, metal, rubber, various resins or another appropriate type of material based on the desired application and the amount of desired flexibility.

Figure 8:
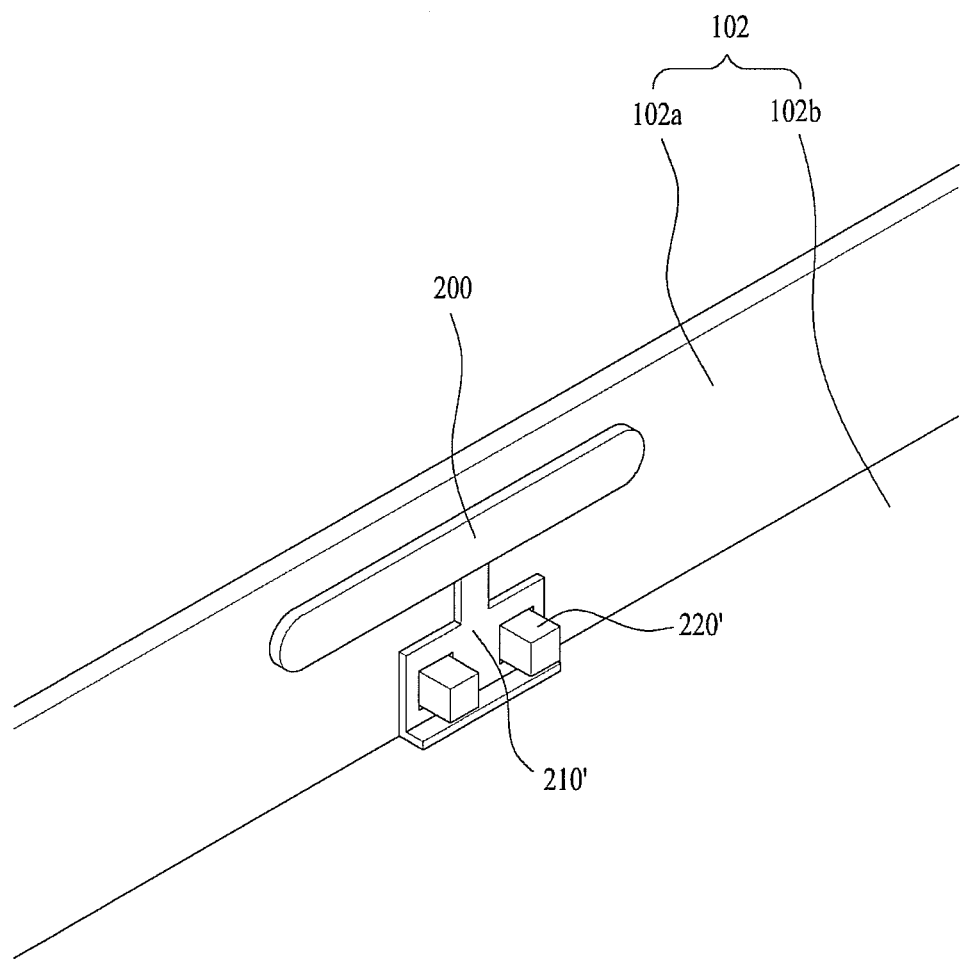
FIGS. 8 and 9 are diagrams illustrating a side key and a case that are provided in a mobile terminal according to another embodiment of the present disclosure.
Figure 9:
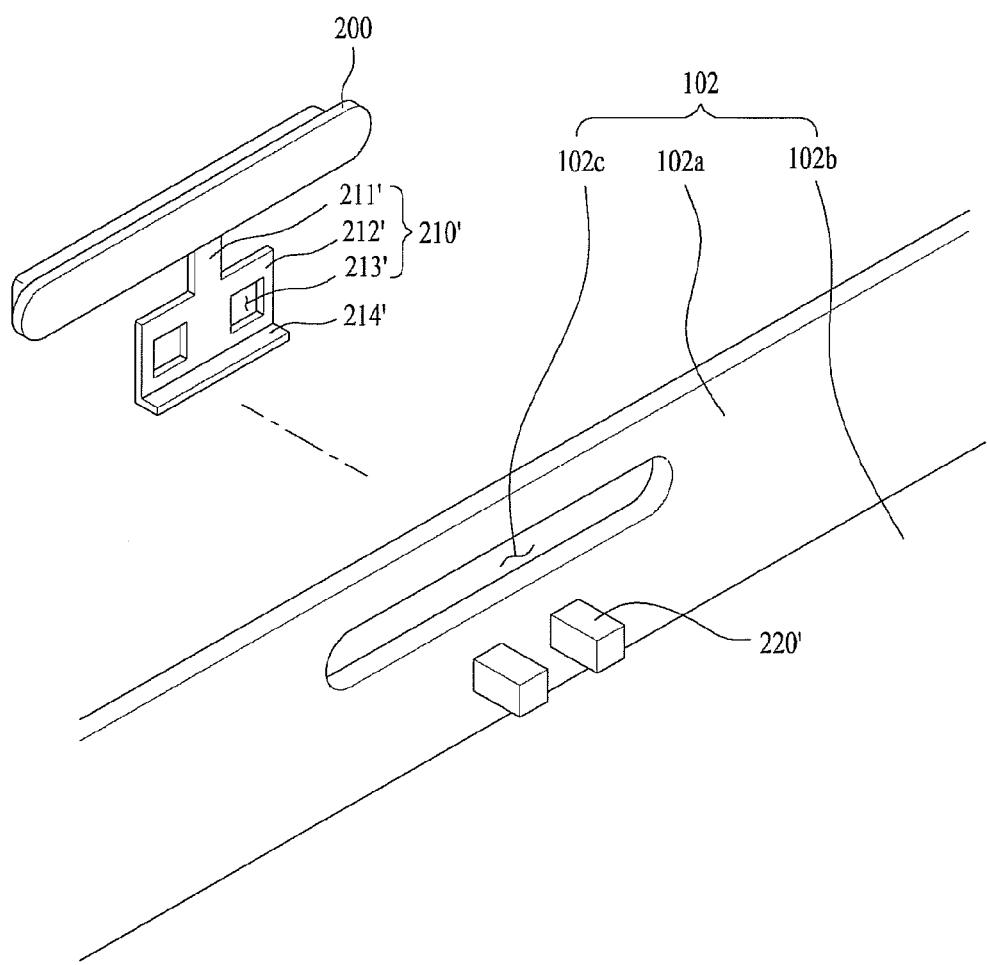

FIGS. 8 and 9 are diagrams illustrating a side key and a case that are provided in a mobile terminal according to another embodiment of the present disclosure. A retaining rib 210' according to this embodiment of the present disclosure includes a retaining hole 213' to insert the retaining projection 220' therein. In other words, the retaining projection 220' is inserted in the hole formed in the retaining rib 210', to retain the movement of the side key 200.

To retain the retaining rib 210' stably, an end 214' of the retaining rib 210' is bent to be inserted in the gap between the retaining projection 220' and the back plate 102b. Accordingly, the movement of the side key 200 may be controlled more stably.

As mentioned above, according to at least one of the embodiments, the button hole 102c may be provided in the lateral surface of the rear case 102 to insert the side key 200 therein. In this instance, the retaining projection 220 and 220' which is able to be integrally formed with the button hole 102c and the retaining rib 210 and 210' which is able to be coupled to the retaining projection 220 and 220' stably can be arranged to retain the side key 200 stably when the side key 200 is assembled.

As broadly described and embodied herein, a mobile terminal may include a cover having an inner surface and an outer surface, a button provided to extend through the cover, at least one first protrusion that protrudes from the inner surface, a second protrusion that extends from the button and configured to engage with the first protrusion. The second protrusion may have a shape complementary to a shape of the first protrusion to be engageable with the first protrusion.

The second protrusion may include a first tab that extends in a first direction and a second tab that extends from a distal end of the first tab in a second direction opposite the first direction. A slot may be formed between the first and second tabs of the second protrusion, the slot having a width that corresponds to a width of the first protrusion, and wherein the slot in the second protrusion is engaged with the first protrusion when the button is positioned through the cover.

The second protrusion may include a third tab that extends from the distal end of the first tab in the second direction opposite the first direction. The second and third tabs may be provided on opposite sides of the first tab of the second protrusion.

The first protrusion may include a retainer that extends from a distal end of the first protrusion in the first direction. The retainer may be formed a prescribed distance from the inner surface of the cover to form a gap between the retainer and the cover, and wherein the gap at the first protrusion is engaged with the slot in the second protrusion. Moreover, the first protrusion is friction fitted with the second protrusion.

The inner surface of the cover may include a lateral surface and a rear surface. The first tab of the second protrusion may be bent such that a first region of the first tab extends from the button toward the first protrusion along the lateral surface of the cover and a second region of the first tab extends from the first region along the rear surface of the cover. The second region of the first tab may extend substantially parallel to the first protrusion. The first protrusion may extend from the lateral surface along the rear surface. Moreover, a plurality of first protrusions are provided a prescribed distance from each other to correspond to a width of the first tab.

The cover may include a hole having a shape corresponding to a shape of the button. The hole may be formed on a lateral surface of the cover.

In one embodiment, a mobile terminal may include a cover having an inner surface and an outer surface, a button provided to extend through the cover, a first retainer provided on the inner wall to extend therefrom, a second retainer provided on the inner wall to extend parallel to the first retainer, a connector that extends from the button and configured to be engageable with the first and second retainers, wherein a distance between the first and second retainers corresponds to a width of the connector and the connector is configured to be positioned between the first and second retainers when the button is positioned through the cover.

The connector may include at least one tab that forms a slot corresponding to a width of the first or second retainers, the slot in the connector being configured to engage with the first or second retainers. The first and second retainers may include a notch having a prescribed height corresponding to a thickness of the connector, and wherein the notch is configured to engage with the connector at the slot.

In one embodiment, a mobile terminal may include a cover having an inner surface and an outer surface, a button provided to extend through the cover, a first mounting bracket formed to extend from the inner surface, and a second mounting bracket attached to the button and configured to be engaged with the first mounting bracket. The first mounting bracket may include at least two retainers that extend from the inner surface of the cover and positioned a prescribed distance from each other, and the second mounting bracket may include a tab having a prescribed width. Moreover, the prescribed width of the tab may correspond to the prescribed distance between the at least two protrusions such that the tab is provided between the retainers to engage the second mounting bracket to the first mounting bracket.

The second mounting bracket may include a second tab provided a prescribed distance from the first tab, and wherein one of the retainers of the first mounting bracket is configured to be inserted between first and second tabs. Moreover, the at least two retainers of the first mounting bracket may include a notch having a prescribed height corresponding to a thickness of the first tab, and wherein the first tab of the second mounting bracket is configured to be inserted in the notch.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a cover having a back plate forming a back surface of the mobile terminal and a lateral wall forming a lateral surface of the mobile terminal, the lateral wall projected forward from the back plate and a button hole formed at the lateral wall;
a button provided at the button hole;
at least one first protrusion that protrudes from an inner surface of the lateral wall such that a gap is formed between at least a part of the first protrusion and the back plate; and
a second protrusion that extends from the button and including an engage part configured to engage with the gap,
wherein the second protrusion has a shape complementary to a shape of the first protrusion to be engageable with the first protrusion,
wherein the button includes a top key having a corresponding size to the size of the button hole configured to inserted in the button hole and a base key extended from a rear surface of the top key in a lateral direction to be retained in the button hole by contacting an inside circumference of the button hole, and
wherein the second protrusion is bent such that a first region of a first tab extends from the button toward the first protrusion along the lateral wall of the cover and a second region of the first tab extends from the first region along the back plate of the cover.

2. The mobile terminal of claim 1, wherein the second protrusion includes the first tab that extends in a first direction and a second tab that extends from a distal end of the first tab in a second direction opposite the first direction.

3. The mobile terminal of claim 2, wherein a slot is formed between the first and second tabs of the second protrusion, the slot having a width that corresponds to a width of the first protrusion, and wherein the slot in the second protrusion is engaged with the first protrusion when the button is positioned through the cover.

4. The mobile terminal of claim 3, wherein the second protrusion includes a third tab that extends from the distal end of the first tab in the second direction opposite the first direction.

5. The mobile terminal of claim 4, wherein the second and third tabs are provided on opposite sides of the first tab of the second protrusion.

6. The mobile terminal of claim 3, wherein the gap extends from a distal end of the first protrusion in the first direction.

7. The mobile terminal of claim 3, wherein the gap at the first protrusion is engaged with the slot in the second protrusion.

8. The mobile terminal of claim 7, wherein the first protrusion is friction fitted with the second protrusion.

9. The mobile terminal of claim 1, wherein the second region of the first tab extends substantially parallel to the first protrusion.

10. The mobile terminal of claim 1, wherein the first protrusion extends along the rear surface.

11. The mobile terminal of claim 1, wherein a plurality of first protrusions are provided a prescribed distance from each other to correspond to a width of the first tab.

12. A mobile terminal comprising:
a cover having a back plate forming a back surface of the mobile terminal and a lateral wall forming a lateral surface of the mobile terminal, the lateral wall projected forward from the back plate and a button hole formed at the lateral wall;
a button provided to extend through the button hole;
a first retainer provided on an inner surface of the lateral wall to extend therefrom;
a second retainer provided on the inner surface of the lateral wall to extend parallel to the first retainer; and
a connector that extends from the button and configured to be engageable with the first and second retainers,
wherein the connector is configured to be positioned between the first and second retainers when the button is positioned through the cover, and
wherein the connector is bent such that a first region of the connector extends from the button toward the first and second retainers along the lateral wall of the cover and a second region of the connector extends from the first region along the back plate of the cover.

13. The mobile terminal of claim 12, wherein a width of the slot corresponds to a width of the first or second retainers.

14. A mobile terminal comprising:
a cover having an inner surface and an outer surface;
a button provided to extend through the cover;
a first mounting bracket formed to extend from the inner surface; and
a second mounting bracket attached to the button and configured to be engaged with the first mounting bracket,
wherein the first mounting bracket includes at least two retainers that extend from the inner surface of the cover and positioned a prescribed distance from each other, and the second mounting bracket includes a first tab having a prescribed width, wherein the prescribed width of the first tab corresponds to the prescribed distance between the at least two retainers such that the first tab is provided between the retainers to engage the second mounting bracket to the first mounting bracket, and
wherein the first tab is bent such that a first region of the first tab extends from the button toward the first mounting bracket along a lateral wall of the cover and a second region of the first tab extends from the first region along a back plate of the cover.

* * * * *